United States Patent [19]

Mzik et al.

[11] Patent Number: 5,874,385
[45] Date of Patent: Feb. 23, 1999

[54] HIGH VISCOSITY CROSSLINKED GELLED ALCOHOL

[75] Inventors: Joseph Mzik; Ronald G. Pierce; Denis R. Gaudet; Dwight M. Bobier, all of Calgary, Canada

[73] Assignee: Canadian Fracmaster Ltd., Canada

[21] Appl. No.: 962,219

[22] Filed: Oct. 31, 1997

Related U.S. Application Data

[63] Continuation of Ser. No. 321,397, Oct. 11, 1994, abandoned.

[30] Foreign Application Priority Data

Oct. 12, 1993 [CA] Canada ................................. 2108194
Mar. 23, 1994 [CA] Canada ................................. 2199682

[51] Int. Cl.$^6$ ............................. E21B 43/17; C09K 3/00
[52] U.S. Cl. .............................. 507/211; 166/308
[58] Field of Search .............................. 507/211; 166/308

[56] References Cited

U.S. PATENT DOCUMENTS

| | | | |
|---|---|---|---|
| 3,167,510 | 1/1965 | Alter ........................................ | 507/211 |
| 3,310,112 | 3/1967 | Nielsen .................................... | 166/280 |
| 3,990,978 | 11/1976 | Hill ......................................... | 507/235 |
| 4,012,327 | 3/1977 | Boothe et al. | |
| 4,202,795 | 5/1980 | Burnham ................................. | 252/332 |
| 4,250,044 | 2/1981 | Hinkel ..................................... | 507/211 |
| 4,552,674 | 11/1985 | Brown et al. ........................... | 507/211 |
| 4,567,947 | 2/1986 | Mzik ....................................... | 166/308 |
| 4,795,574 | 1/1989 | Syrinek et al. ......................... | 507/238 |
| 4,877,894 | 10/1989 | Huddleston ............................. | 558/113 |
| 5,372,732 | 12/1994 | Harris et al. ............................ | 507/217 |
| 5,420,174 | 5/1995 | Dewprashad ............................ | 523/130 |

FOREIGN PATENT DOCUMENTS 1174841 9/1982 Canada .

OTHER PUBLICATIONS

Hawley's Condensed Chemical Dictionary 11$^{th}$Ed. 1990 "guar gum" excerpt from pp. 580–581.

*Primary Examiner*—C. H. Kelly
*Attorney, Agent, or Firm*—Lerner, David, Littenberg, Krumholz & Mentlik

[57] ABSTRACT

A fracturing fluid composition for use in fracturing underground formations, such as oil or gas wells is described. It includes at least one anhydrous aliphatic alcohol, a modified guar gum polymer, and as a complexor, a sodium borate salt. A gel breaker which acts over a time period to degrade the guar gum cross linked polymer and thereby reduce the viscosity of the gel is provided as well to aid in the removal thereof from an oil or gas well that has been fractured by application of the fluid under pressure.

39 Claims, No Drawings

HIGH VISCOSITY CROSSLINKED GELLED ALCOHOL

This is a continuation, of application Ser. No. 08/321, 397, filed Oct. 11, 1994, now abandoned.

The present invention relates to the field of oil and gas well fracturing.

In the area of oil and gas field exploration and development, a technique that is utilized to increase production from a well, or to make a non-productive well productive again is hydraulic fracturing. Generally speaking, this involves injection of fluid under high pressure down a well bore. This causes an increase in pressure in the subterranean formation with which the well bore communicates, and fracturing of such formation thereby creating access to the well bore for untapped oil or gas in the formation. The fluid that is introduced into the formation may include various propping agents, such as sand, or walnut shell fragments, to increase the flow of oil or gas through a newly fractured formation.

It is known, moreover, to utilize a gel in fracturing techniques, in order to increase the viscosity of the fracturing fluid, and enhance propant transport. For instance, in Canadian Patent No. 1,174,841, which has been assigned to the present applicant, a fracturing fluid is described that comprises at least one substantially anhydrous aliphatic alcohol, a nonionic homopolymer to form a gel with the alcohol that has a molecular weight from about 4 million to about 5 million. Such a fracturing fluid also includes, as a gel activating agent, an alkali metal halide or an alkaline metal earth halide. The aliphatic alcohol utilized in such a fluid is generally a one to four carbon alcohol, including up to five percent water. The non ionic homopolymer utilized is a polyalkaline oxide such as poly(ethylene oxide) in an amount of from 0.1% to 3% by volume, and a suitable activating agent is potassium, sodium, calcium or magnesium halide, in amounts generally under 1%. This prior art fracturing fluid of the applicant was developed to meet a need that was clear from the existing prior art, for a fracturing gel having a low water content, because of the fact that water may be considered as a subterranean formation contaminant.

There have been other attempts to utilize substantially anhydrous alcohol gels, such as is taught in U.S. Pat. No. 4,012,327 which relates to the use of alcohols that are thickened, but not necessarily gelled, by aminomethylated polyacrylamide. The gel in such a case, though, is formed by a substantial linear polymer, and so will exhibit limited viscosity, shear strength, and stability.

An object of the present invention is to provide an improved anhydrous alcohol gel, that will exhibit a high degree of shear stability, and high viscosity at elevated temperatures. A further object of the present invention is to provide an improved fracturing fluid that will form a shear stable gel in an anhydrous alcohol medium at elevated temperature, and exhibit a predictable breakdown rate in view of measured downhole conditions. In this latter regard, it will be understood that injection of a fracturing fluid in the form of a gel is of little use if the gel remains in its gelled state in the formation. It is essential that the gel break down under known physical or chemical conditions.

The fracturing fluid of the present invention therefore in one aspect includes, as well as a gel complexor, a gel breaker. It will be understood that the gel breaker chosen for use will be relatively slow acting as compared to the complexor or cross linker, so that the fluid gel may perform its fracturing function before the gel is broken. The use of a slow acting gel breaker, that will act in a predictable manner, in combination with a relatively faster acting gelling agent, permits the addition of the gel breaker to the fracturing fluid as it is being pumped down a well.

In accordance with the first aspect of the present invention therefore, a fracturing fluid is provided that utilizes a modified guar gum polymer, in anhydrous alcohol, preferably methyl alcohol, to form a gel. As a gel complexor, a sodium borate salt is used.

The fracturing fluid of this aspect of the present invention is appropriate for use at high temperatures. As used herein, the term "high temperatures" shall mean temperatures in excess of 60° C., and low temperatures shall mean temperatures below 60° C.

Guar gum is a known, naturally occurring polymer, the ground endosperms of cyamopsis tetragonalobus. It is a linear polymer of (1→4)-B-D mannopyranosyl units with α-D-galactopyranosyl units attached by (1→6) linkages. In its uncomplexed linear state it exhibits a molecular weight of about 220,000. Particularly useful modification of guar gum according to the present invention include hydroxy, carboxy and alkyl guar gums. The applicant has found that about 6 kg of guar gum, or modified guar gum, per cubic metre of anhydrous alcohol, will form an appropriate gel, when complexed with 14–18 litres of sodium borate or sodium tetraborate. The borate solution is prepared on the basis of 0.5 to 4.0 kg per cubic metre of fracturing fluid.

Prior to addition of the cross linking agent, fumaric acid (or another suitable acid) may be added into methanol with guar gum to assist in formation of the base gel.

The gel breaker that is added to the fracturing fluid is chosen for its ability to degrade the cross linked guar gum in a desired time frame, and suitable breakers include ammonium persulfate, sodium persulfate and sodium perborate, in quantities of 0.1 to 10.0 Kg per cubic metre of fracturing fluid. The large degree of variation is a result of combined facts that: (a) depending on the concentration of guar gum polymer in the solution, a more or less thick gel will result; (b) varying amounts of cross linking agent (borate) will have been used, depending on the extent of cross linking, and corresponding viscosity of the gel desired; (c) the desired down hole residence time (d) the downhole depth and temperature, and other factors that will be obvious to one skilled in the art.

Furthermore, the breaker utilized may be coated, in a conventional manner, if desired. The use of a coating on a granular breaker provides a further degree of control, for situations wherein it is desired to have substantially no gel breakdown for a given period of time. Coating a granular breaker achieves such a degree of control by selection of coatings having known rates of dissolution in the alcohol chosen as the basis for the fracturing fluid.

It is to be understood that any desirable propant may be combined on the fly with the fracturing fluid of the present invention. Suitable propants for use in conjunction with the fracturing fluid of the present invention include sand, synthetic sand, or synthetic coated sand.

In a broad aspect, then, the present invention relates to a fracturing fluid composition for use in fracturing underground formations, such as oil or gas wells, comprising: (i) at least one anhydrous aliphatic alcohol; (ii) a modified guar gum polymer; (iii) as a complexor, a sodium borate salt; and (iv) a gel breaker which acts over a time period to degrade the guar gum cross linked polymer and thereby reduce the viscosity of the gel, to aid in the removal thereof from a well.

Preferably, the alcohol is selected from the group including methyl, ethyl or isopropyl alcohol, and the modified guar gum is selected from the group including hydroxy, carboxy and alkyl guar gum.

Also preferably, the complexor is sodium tetraborate in a solid or liquid form equivalent to from 0.5 to 4.0 Kg per cubic metre of alcohol.

To obtain an effective fracturing fluid, said modified guar gum polymer is mixed with the alcohol in a concentration of from 0.1 to 2.0% by weight per volume of alcohol, and a sufficient quantity of acidifying agent such as fumaric acid is added. Furthermore, the quantity of gel breaker is selected to break down the polymer within a predetermined time period, usually 1 to 24 hours.

The gel breaker is, in a preferred embodiment, ammonium persulphate, sodium persulphate, sodium perborate or a mixture of one or more of the foregoing, and wherein said gel breaker may be coated or covered. The concentration of the breaker may be 0.1 to 10.0 Kg/m$^3$ of alcohol.

The composition, in its preferred form, is admixed with a propant selected from sand, synthetic sand or synthetic coated sand.

The present invention also provides, in another aspect, a fracturing fluid that functions effectively at low temperatures (as defined above) by combining either a very low concentration of sodium borate complexor, or no sodium borate complexor with a substantial quantity of sodium ammonium persulfate gel breaker and a substantially similar quantity of sodium perborate that has been observed to function, at low temperatures, as a gel complexor or cross-linker, and a gel breaker.

The applicant has discovered that sodium perborate will function at low temperatures to promote the cross-linking of a guar gum polymer in methyl alcohol, in a very brief time, of from about 90 to about 130 seconds. If more rapid gelation is desired, a weak 3.5% sodium borate solution may be added as well, and gelation will take place in from 1 to 30 seconds. A particularly attractive feature of the use of sodium perborate at low temperatures, as will be illustrated in the tables below is that continued exposures of the gel to sodium perborate (which may be mixed with ammonium persulfate) will cause the gel to degrade.

Furthermore, the persulfate portion of the breaker utilized may be coated, in a conventional manner, if desired. The use of a coating on a granular breaker provides a further degree of control, for situations wherein it is desired to have substantially no gel breakdown for a given period of time. Coating a granular breaker achieves such a degree of control by selection of coatings having known rates of dissolution in the alcohol chosen as the basis for the fracturing fluid.

In another broad aspect, then, the present invention relates to a fracturing fluid composition for use in fracturing low temperature underground formations, such as oil or gas wells, comprising: (i) at least one anhydrous aliphatic alcohol; (ii) a modified guar gum polymer; (iii) as a complexor, a sodium perborate salt; and (iv) a gel breaker including sodium perborate which acts over a time period to degrade the guar gum cross linked polymer and thereby reduce the viscosity of the gel, to aid in the removal thereof from a well. Preferably, the alcohol is selected from the group including methyl, ethyl or isopropyl alcohol, and the modified guar gum is selected from the group including hydroxy, carboxy and alkyl guar gum.

The complexor in this form of the invention preferably includes a minor amount of sodium tetraborate in a solid or liquid form equivalent to about 0.35 Kg or less per cubic metre of fluid. To obtain an effective fracturing fluid, said modified guar gum polymer is mixed with the alcohol in a concentration of from 0.1 to 2.0% by weight per volume of alcohol, and a sufficient quantity of acidifying agent such as fumaric acid is added.

In a further broad aspect, the present invention relates to a method of fracturing an underground formation such as an oil or gas well comprising: (i) injecting the formation with an effective amount of a fracturing fluid gel composition comprising: (a) at least one anhydrous aliphatic alcohol; (b) a modified guar gum polymer forming a gel with the alcohol and a complexor forming a very viscous elastic gel; and (c) a gel breaker which acts over a period of time to degrade the polymer and thereby reduce the viscosity of the gel; and (ii) applying pressure to the composition in the formation to induce fracture of the formation.

In a further broad aspect, the present invention relates to a method of fracturing a low temperature underground formation such as an oil or gas well comprising: (i) injecting the formation with an effective amount of a fracturing fluid gel composition comprising: (a) at least one anhydrous aliphatic alcohol; (b) a modified guar gum polymer quickly forming a gel with the alcohol and a sodium perborate complexor; and (c) a gel breaker including sodium perborate which acts over a longer period of time to degrade the polymer and thereby reduce the viscosity of the gel; and (ii) applying pressure to the composition in the formation to induce fracture of the formation.

In the method of the present invention the alcohol is selected from the group including methyl, ethyl or isopropyl alcohol and the modified guar gum is selected from the group including hydroxy, carboxy and alkyl guar gum.

In the method as aforesaid the complexor is sodium tetraborate in a solid or liquid form equivalent to from 0.5 to 4.0 Kg per cubic metre of alcohol, and the modified guar gum polymer is mixed with the alcohol in a concentration of from 0.1 to 2.0% by weight per volume of alcohol. A sufficient quantity of acidifying agent such as fumaric acid is added. The quantity of gel breaker is selected to break down the polymer within a predetermined time period, such as 1–24 hours.

The order of addition is as follows: the alcohol and guar gum are mixed first, with the fumaric acid, to form a base gel, that is permitted to gel for several minutes. The borate complexor is then added, followed by the gel breaker.

In the method of the present invention relating to higher temperature wells, the gel breaker is ammonium persulphate, sodium persulphate, sodium perborate or a mixture of one or more of the foregoing, and said gel breaker may be coated or covered. The concentration of the breaker is 0.1 to 10.0 Kg/M$^3$ of alcohol.

Moreover, said alcohol, said guar gum, said complexor and said gel breaker are mixed together as they are being injected in a said well, in a most preferred embodiment.

In the method of the present invention as aforesaid, the order of addition of complexor and breaker is not considered crucial. Of more importance will be the selection of an appropriate quantity of breaker, and in this regard, one must consider the temperature at the bottom of the well. As an example, utilizing a fracturing fluid prepared with 6 Kg of guar gum per cubic metre of 100% methanol, with about 16 litres of a 3.5% sodium borate solution added as a complexor, and 0.08 Kg of fumaric acid per cubic metre as an acidifying agent, the following "high temperature" results are obtained with sodium perborate breaker:

TABLE I

BREAK TIMES OF METHANOL GEL AT VARIOUS
CONCENTRATIONS AND TEMPERATURES
TEMPERATURE (°C.)

| Breaker Concentration ($Kg/m^3$) | 60 | 70 | 80 | 90 |
|---|---|---|---|---|
| 0.1 | | | | |
| 0.2 | | 4 hrs | 3 hrs | 2 hrs |
| 0.3 | | 3 hrs | 2 hrs | |
| 0.4 | 7 hrs | | | |
| 0.5 | 6 hrs | | | |

As an example, utilizing a fracturing fluid prepared with 6 Kg of guar gum per cubic metre of 100% methanol, and 0.08 Kg of fumaric acid per cubic metre as an acidifying agent, the low temperature results are obtained with complexors and breakers indicated in Tables II and III, which follow.

Table II represents typical degradation rates of cross-linked methanol gel at given temperatures. Variations in complexor doses affect not only the gel development, but also the degradation. The cross-link time can vary from 1 to 30 seconds.

Table III illustrates the gel characteristics at various temperatures where only solid additives were used. This system requires a very accurate preparation and handling. The gel development is between 90 to 130 seconds.

Both systems produce a very elastic and shear stable cross-linked gel.

TABLE II

BREAK TIMES OF METHANOL GEL AT VARIOUS
CONCENTRATIONS OF ADDITIVES AND TEMPERATURES (HRS)

| BREAKER ($Kg/m^3$) | | 3.5% BORATE | TEMPERATURE (°C.) | | | |
|---|---|---|---|---|---|---|
| "A" | "B" | ($L/m^3$) | 20 | 30 | 40 | 50 |
| 2 | 2 | 10 | 11 | 4 | 2 | 1 |
| 3 | 2 | 10 | | 4.5 | | |
| 2 | 3 | 10 | 6 | 3.5 | | |

BREAKER "A" IS $NaBO_2.H_2O_2.3H_2O$; BREAKER "B" is $(NH_4)_2S_2O_8$

TABLE III

BREAK TIMES OF METHANOL GEL AT VARIOUS
CONCENTRATIONS OF ADDITIVES AND TEMPERATURES (HRS)

| COMPLEXOR/BREAKER "A" ($Kg/m^3$) | BREAKER "B" ($Kg/m^3$) | TEMPERATURE (°C.) | | | |
|---|---|---|---|---|---|
| | | 20 | 30 | 40 | 50 |
| 3 | 3 | 7 | 3 | 1.5 | |
| 3 | 2 | 10 | 4.5 | 3 | 1 |

COMPLEXOR/BREAKER "A" used is $NaBO_2.H_2O_2.3H_2O$

It will be understood, then, that depending on the extent of fracturing desired at a given location, and the measured down hole temperature, different sorts and amounts of breaker will be added to the fracturing fluid as it is pumped down a well.

It a preferred method according to the present invention, after the base fel is formed, the complexor and breaker of the fracturing fluid are mixed together "on the fly", as the fluid is being pumped down a well. In this way, exposure of the guar gum to the complexor and breaker is not effected until just prior to injection of the fluid into a formation. This results in better pumpability into a well, and more accurate determination of when the gel will have broken. Moreover, should there be any delay due to equipment failure or the like, there is no wasted gel/complexor/breaker fluid.

It is to be understood that the examples described above are not meant to limit the scope of the present invention. It is expected that numerous variants will be obvious to the person skilled in the oil and gas well fracturing fluid design field without any departure from the spirit of the invention. The appended claims, properly construed, form the only limitation upon the scope of the invention.

We claim:

1. An anhydrous fracturing fluid composition for use in fracturing underground formations, including oil or gas wells, comprising:
   i) at least one anhydrous aliphatic alcohol;
   ii) a modified guar gum polymer;
   iii) as a complexor, a sodium borate salt; and
   iv) a gel breaker which acts over a time period to degrade the guar gum polymer and thereby reduce the viscosity of the fracturing fluid composition to aid in the removal thereof from a well.

2. A fracturing fluid composition as claimed in claim 1 in which the alcohol is selected from the group consisting of methyl, ethyl and isopropyl alcohol.

3. A composition as claimed in claim 2 in which the modified guar gum is selected from the group consisting of a hydroxy alkyl guar gum, a carboxy alkyl guar gum and an alkyl guar gum.

4. A composition as claimed in claim 3 in which the complexor is sodium tetraborate in a solid or liquid form equivalent to from 0.5 to 4.0 Kg per cubic metre of alcohol.

5. A fracturing fluid composition as claimed in claim 4 in which the modified guar gum polymer is hydroxy propyl, carboxy methyl, hydroxy ethyl or hydroxy propyl guar gum.

6. A composition as claimed in claim 5, in which said modified guar gum polymer is mixed with said alcohol in a concentration of from 0.1 to 2.0% by weight per volume of alcohol, and an amount of an acidifying agent which is sufficient to assist in the formation of a gel.

7. A composition as claimed in claim 6, in which the quantity of gel breaker is selected to break down the polymer within a predetermined time period.

8. A composition as claimed in claim 7, in which the quantity of gel breaker is selected to break down the polymer in from 1 to 24 hours.

9. A composition as claimed in claim 8, in which the gel breaker is ammonium persulphate, sodium persulphate, sodium perborate or a mixture thereof, and wherein said gel breaker is capable of being coated or covered.

10. A composition as claimed in claim 9 in which the concentration of the breaker is 0.1 to 10.0 $Kg/m^3$ of alcohol.

11. A composition as claimed in any one of claims 1–10, further comprising a proppant admixed therewith.

12. A composition as claimed in any one of claims 1–10, further comprising a proppant which is sand, synthetic sand or synthetic sand, admixed therewith.

13. A method of fracturing an underground formation such as an oil or gas well comprising the steps of:
   i) injecting said formation with an amount of an anhydrous fracturing fluid gel composition sufficient to induce fracture of said formation comprising:
      (a) at least one anhydrous aliphatic alcohol;
      (b) a modified guar gum polymer and a complexor forming a gel with said alcohol; and
      (c) a gel breaker which acts over a period of time to degrade the polymer and thereby reduce the viscosity of said gel; and ii. applying pressure to said composition in said formation to induce fracture of said formation.

14. A method as claimed in claim 13 in which the alcohol is methyl, ethyl or isopropyl alcohol.

15. A method as claimed in claim 14 in which the modified guar gum polymer is a hydroxy alkyl guar gum, a carboxy alkyl guar gum or an alkyl guar gum.

16. A method as claimed in claim 15 in which the complexor is sodium tetraborate in a solid or liquid form equivalent to from 0.5 to 4.0 Kg per cubic metre of alcohol.

17. A method as claimed in claim 13 in which the modified guar gum polymer is hydroxy propyl, carboxy methyl, hydroxy ethyl or hydroxy propyl guar gum.

18. A method as claimed in claim 16, in which said modified guar gum polymer is mixed with said alcohol in a concentration of 0.12 to 2.0% by weight per volume of alcohol, and an amount of an acidifying agent which is sufficient to assist in the formation of a gel.

19. A method as claimed in claim 17, in which the quantity of gel breaker is selected to break down the polymer within a predetermined time period.

20. A method as claimed in claim 18, in which the quantity of gel breaker is selected to break down the gel in from 1 to 24 hours.

21. A method as claimed in claim 19, in which the gel breaker is ammonium persulphate, sodium persulphate, sodium perborate or a mixture thereof and wherein said gel breaker is capable of being coated or covered.

22. A method as claimed in claim 20 in which the concentration of the breaker is 0.1 to 10.0 Kg/m$^3$ of alcohol.

23. A method as claimed in any of claims 13–21, further comprising a proppant admixed with said fracturing fluid gel composition.

24. A method as claimed in any of claims 13–21, further comprising a proppant which is sand, synthetic sand, or synthetic coated sand, admixed with said fracturing fluid gel composition.

25. A method as claimed in any of one of claims 13–21, wherein said alcohol and said guar gum are premixed together, with said acidifying agent to form a base gel, said complexor and said gel breaker being added as they are being injected into a well.

26. An anhydrous fracturing fluid composition for use in fracturing low temperature underground formations that are below 60° C., comprising:
  i) at least one anhydrous aliphatic alcohol;
  ii) a modified guar gum polymer;
  iii) as a complexor, a sodium perborate salt; and
  iv) a gel breaker including sodium perborate which acts over a time period to degrade the guar gum cross linked polymer and thereby reduce the viscosity of fracturing fluid composition, to aid in the removal thereof from a well.

27. A fracturing fluid as claimed in claim 26, wherein said alcohol is selected from the group consisting of methyl ethyl and isopropyl alcohol, said alcohol containing up to 5% water.

28. A fracturing fluid as claimed in claim 27, wherein said modified guar gum is selected from the group consisting of hydroxy, carboxy and alkyl guar gum.

29. A fracturing fluid as claimed in claim 28, further comprising up to about 0.35 Kg boric acid or sodium tetraborate complexor per cubic metre.

30. A fracturing fluid as claimed in claim 28 or 29, wherein said sodium perborate is present in a quantity of 2 to 10 Kg per cubic metre.

31. A fracturing fluid as claimed in claim 28 or 29, further comprising ammonium persulfate as a gel breaker, in quantity of 2 to 10 Kg per cubic metre.

32. A method of fracturing a low temperature underground formation such as an oil or gas well comprising the steps of:
  i) injecting the formation with an effective amount of an anhydrous fracturing fluid gel composition comprising:
    (a) at least one anhydrous aliphatic alcohol;
    (b) a modified guar gum polymer quickly forming a gel with the alcohol and a sodium perborate complexor;
    (c) a gel breaker including sodium perborate which acts over a longer period of time to degrade the polymer and thereby reduce the viscosity of the gel; and
  ii) applying pressure to the composition in the formation to induce fracture of the formation.

33. A method as claimed in claim 32, wherein said alcohol is selected from the group consisting of methyl, ethyl and isopropyl alcohol, said alcohol containing up to 5% water.

34. A method as claimed in claim 33, wherein said modified guar gum is selected from the group consisting of hydroxy, carboxy and alkyl guar gum.

35. A method as claimed in claim 34, further comprising up to about 0.35 Kg boric acid or sodium tetraborate complexor per cubic metre.

36. A method as claimed in claim 33 or 34, wherein said sodium perborate is present in a quantity of 2 to 10 Kg per cubic metre.

37. A method as claimed in claim 33 or 34, further comprising ammonium persulfate as a gel breaker, in quantity of 1 to 10 Kg per cubic metre.

38. A composition as claimed in claim 6 wherein said acidifying agent is fumaric acid.

39. A composition as claimed in claim 18 wherein said acidifying agent is fumaric acid.

* * * * *

UNITED STATES PATENT AND TRADEMARK OFFICE
CERTIFICATE OF CORRECTION

PATENT NO. : 5,874,385
DATED : February 23, 1999
INVENTOR(S) : Mzik et al.

It is certified that error appears in the above-indentified patent and that said Letters Patent is hereby corrected as shown below:

Column 1, after line 5, insert --FIELD OF THE INVENTION--.

Column 1, after line 7, insert --BACKGROUND OF THE INVENTION--.

Column 1, after line 49, insert --SUMMARY OF THE INVENTION--.

Column 2, after line 4, insert --DESCRIPTION OF THE PREFERRED EMBODIMENTS--.

Column 4, line 52, "Kg/M$^3$" should read --Kg/m$^3$--

Column 6, line 21, delete "the".

Signed and Sealed this

Fifth Day of October, 1999

Attest:

Q. TODD DICKINSON

Attesting Officer

Acting Commissioner of Patents and Trademarks